Sept. 22, 1964 R. J. BROADWELL 3,149,645
HYDRAULIC PRESSURE RESERVOIR
Original Filed Nov. 4, 1959 6 Sheets-Sheet 1

INVENTOR.
ROBERT J. BROADWELL
BY
Cushman, Darby & Cushman

Sept. 22, 1964 R. J. BROADWELL 3,149,645
HYDRAULIC PRESSURE RESERVOIR
Original Filed Nov. 4, 1959 6 Sheets-Sheet 2

INVENTOR.
ROBERT J. BROADWELL
BY
Cushman, Darby & Cushman

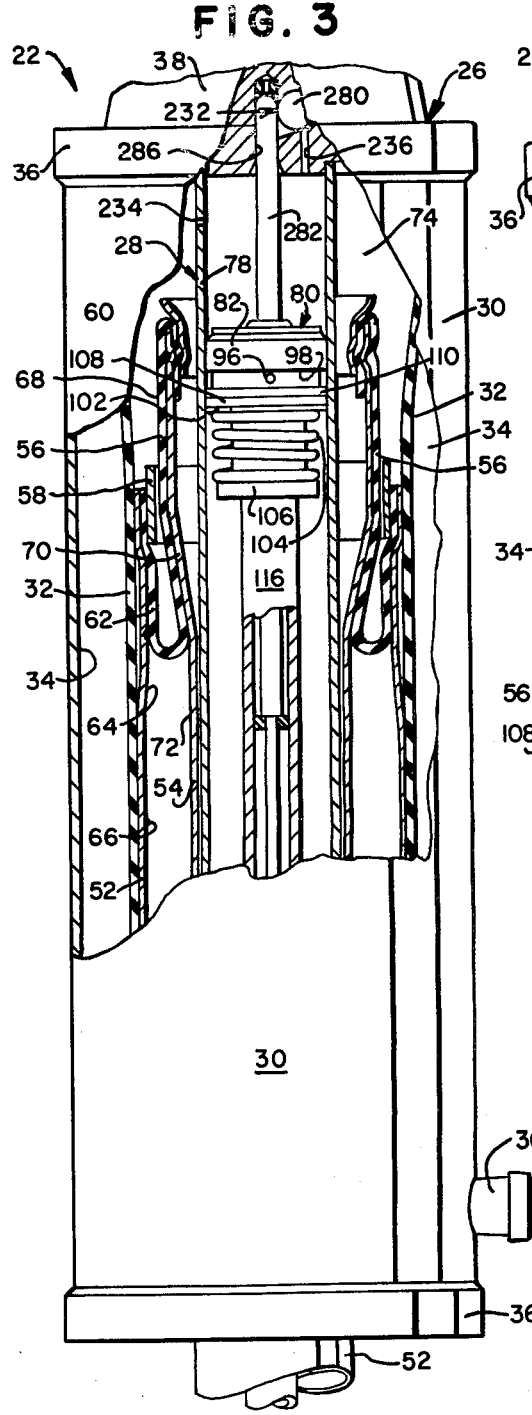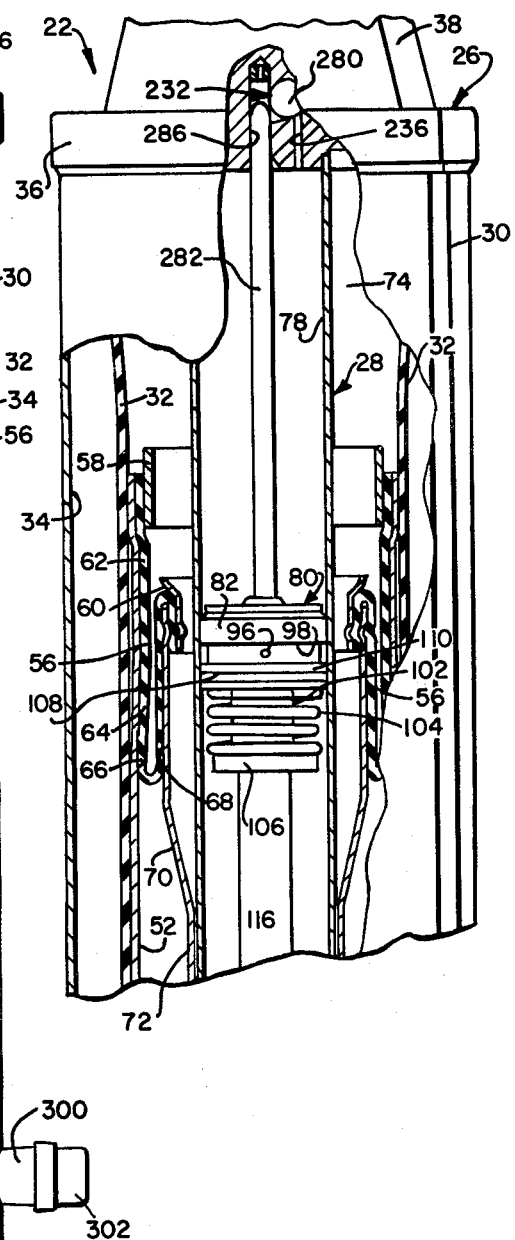

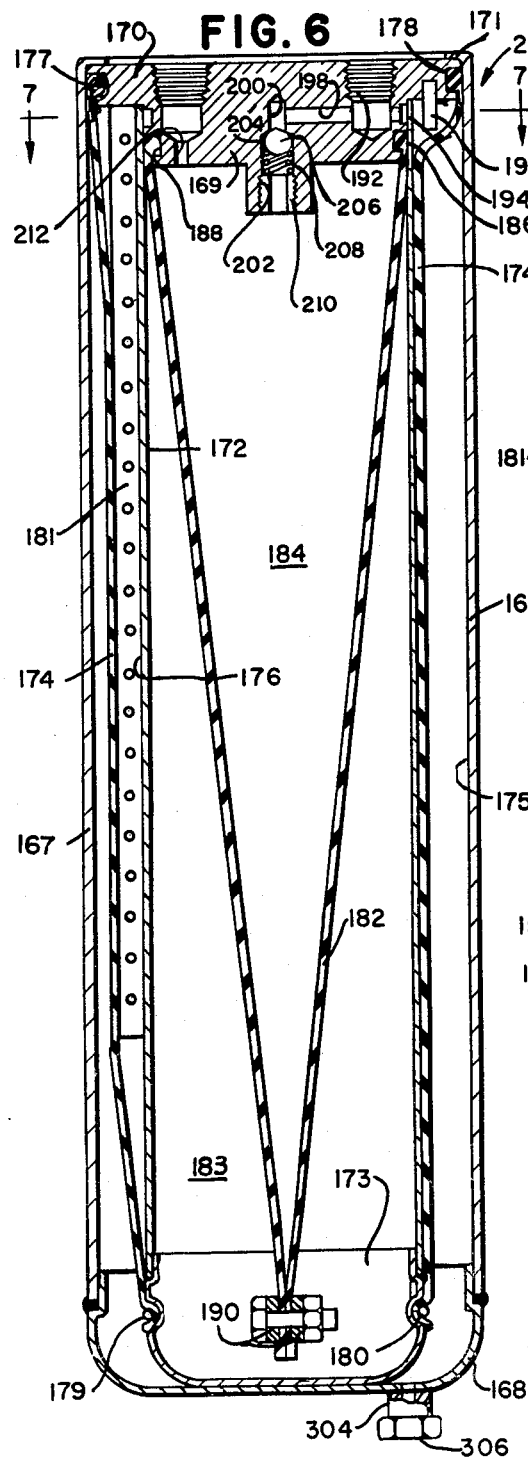
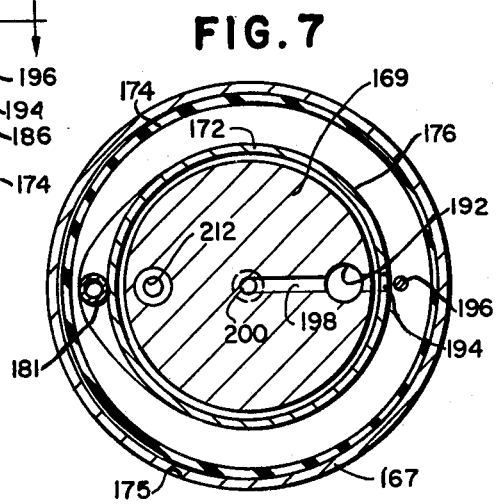
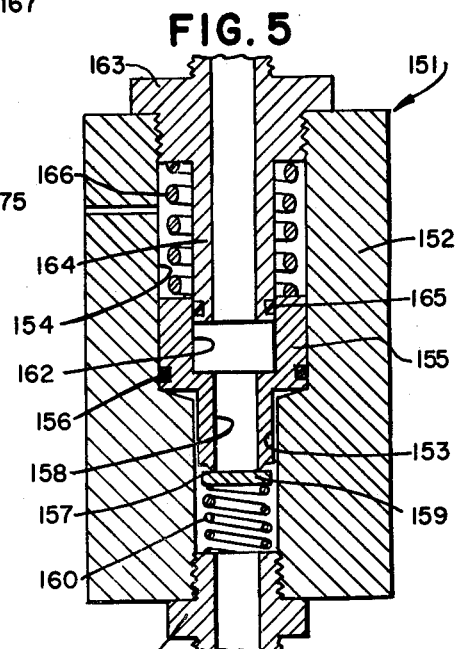

Sept. 22, 1964  R. J. BROADWELL  3,149,645
HYDRAULIC PRESSURE RESERVOIR

Original Filed Nov. 4, 1959  6 Sheets-Sheet 5

INVENTOR.
Robert J. Broadwell
BY
Cushman, Darby & Cushman

Sept. 22, 1964 R. J. BROADWELL 3,149,645
HYDRAULIC PRESSURE RESERVOIR
Original Filed Nov. 4, 1959 6 Sheets-Sheet 6

INVENTOR.
Robert J. Broadwell
BY
Cushman, Darby & Cushman

United States Patent Office 3,149,645
Patented Sept. 22, 1964

3,149,645
HYDRAULIC PRESSURE RESERVOIR
Robert J. Broadwell, Cleveland, Ohio, assignor, by mesne assignments, to Maremont Corporation, Chicago, Ill., a corporation of Illinois
Original application Nov. 4, 1959, Ser. No. 850,957, now Patent No. 3,083,026, dated Mar. 26, 1963. Divided and this application Feb. 19, 1963, Ser. No. 259,490
5 Claims. (Cl. 138—30)

This invention relates to fluid reservoirs and more particularly to a hydraulic fluid reservoir assembly of the type particularly adapted to be used in connection with a hydro-pneumatic vehicle suspension. The present application constitutes a division of my co-pending application Serial No. 850, 957, filed November 4, 1959 now Patent No. 3,083,026, entitled Hydro-Pneumatic Vehicle Suspension System.

An object of the present invention is the provision of an improved hydraulic fluid reservoir assembly having a high pressure chamber and a low pressure chamber embodied therein which is particularly useful in a self-leveling hydro-pneumatic suspension system.

Another object of the present invention is the provision of a hydraulic fluid reservoir assembly of the type described having means for bypassing a supply of high pressure fluid from the high pressure chamber to the low pressure chamber in response to the existence of a predetermined maximum pressure in the high pressure chamber.

A further object of the present invention is the provision of a hydraulic fluid reservoir assembly of the type described which is simple in construction, efficient in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 3 is a fragmentary elevational view, partly in section, of the combined self-leveling hydro-pneumatic strut and pump damper unit, showing the position of the parts during compression;

FIGURE 4 is a view similar to FIGURE 3 showing the position of the parts during rebound;

FIGURE 5 is an enlarged vertical sectional view of the back pressure control valve of the present system;

FIGURE 6 is a vertical sectional view of a preferred form of reservoir unit, embodying the principles of the present invention;

FIGURE 7 is a cross-sectional view taken along the line 7—7 of FIGURE 6;

Figure 10:
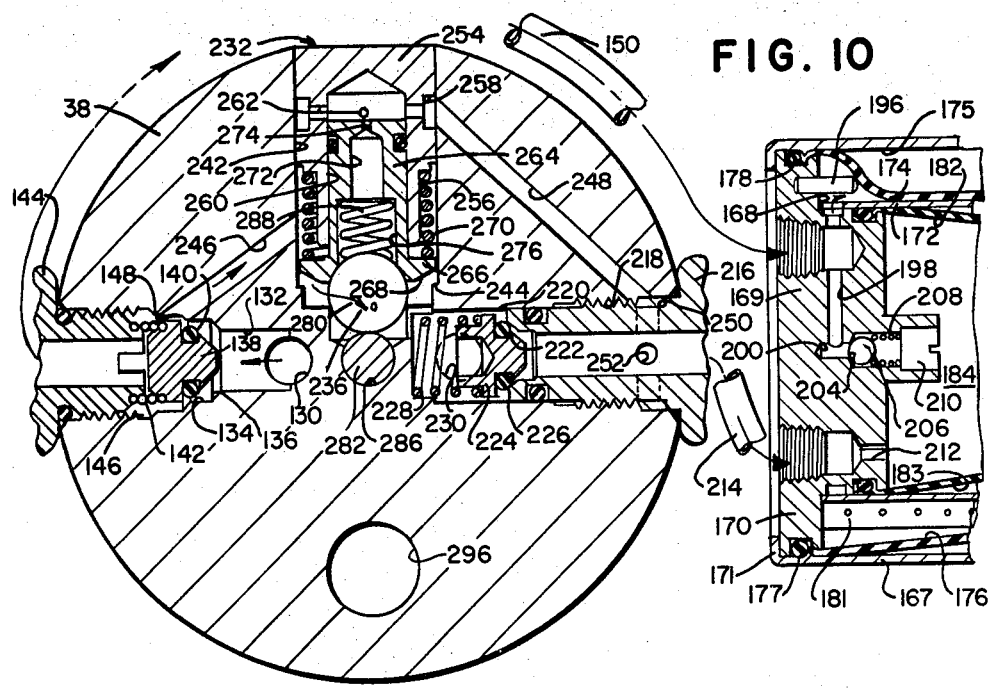
Figure 11:
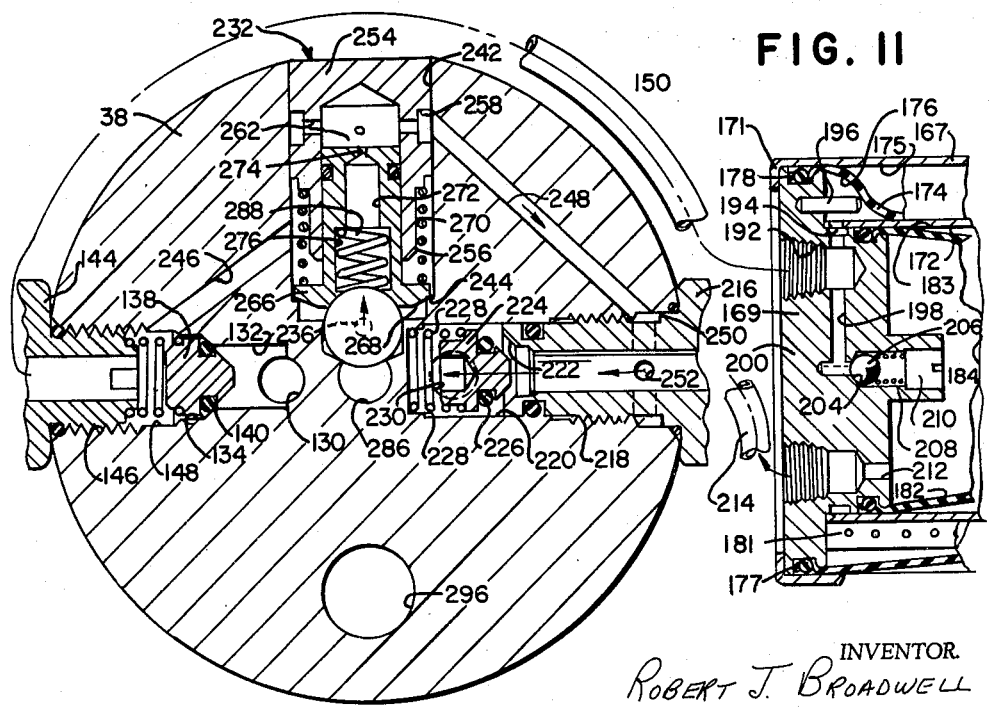

FIGURE 10 is a sectional view taken along a surface of revolution passing through the axes of the valve mechanism and the inlet and outlet valves showing the position of the inlet and outlet valves and the leveling valve mechanism during compression and schematically illustrating the direction of flow to the reservoir unit, the latter being shown in fragmentary vertical section; and FIGURE 11 is a view similar to FIGURE 10 showing the position of the parts during rebound.

Figure 1:
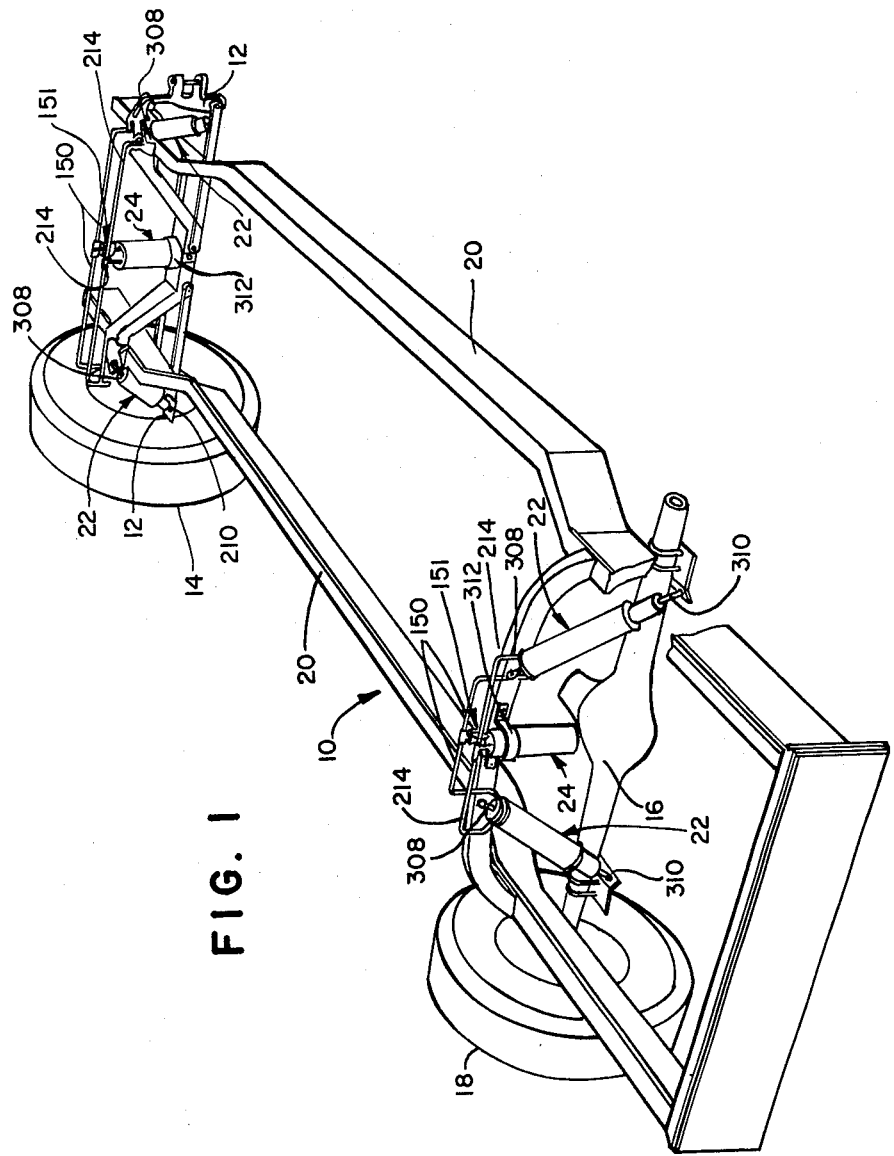
FIGURE 1 is a perspective view of a suspension system, mounted between the sprung and unsprung masses of the vehicle, showing a preferred manner of use of a hydraulic fluid reservoir assembly, embodying the principles of the present invention.

Referring now more particularly to the drawings, there is shown in FIGURE 1 a vehicle, generally indicated at 10, having the usual unsprung mass, including front wheel axle mounts 12, front wheels 14, rear axle assembly 16 and rear wheels 18 and the usual sprung mass including a frame structure 20. The sprung mass is suspended on the unsprung mass by a self-leveling hydro-pneumatic suspension system. As shown, the self-leveling hydro-pneumatic suspension system includes a combined self-leveling hydro-pneumatic strut and pump damper unit, generally indicated at 22, mounted between the front wheel axle mounts 12 of each front wheel 14 and on opposite sides of the rear axle assembly 16 adjacent each rear wheel 18 and the frame 20. The pair of combined strut and pump damper units 12 adjacent the front and rear wheels are hydraulically connected in parallel with each other and with a reservoir unit, generally indicated at 24, embodying the principles of the present invention.

As best shown in FIGURES 2-4, the combined unit 22 includes a hydro-pneumatic strut assembly, generally indicated at 26, and a pump damper assembly, generally indicated at 28, mounted therein. The hydro-pneumatic strut assembly includes an exterior tubular casing member or housing 30 having a sleeve diaphragm 32 of a flexible material, preferably rubber or the like, disposed therein and defining within the casing member an outer annular air chamber 34. The sleeve diaphragm is mounted within the casing member 30, by any suitable means, and as best shown, the ends of the casing member are formed to provide annular channels 36. Mounted within the channel 36 formed at the upper end of the cylindrical member is an end casting or closure member 38 having a peripheral flange 40 formed thereon for engagement within the associated channel 36. An annular groove 42 is formed in the peripheral flange of the closure member for receiving the adjacent end of the diaphragm 32 which is secured in the groove by means of an O-ring seal 44 of conventional construction, the diaphragm end being folded back over the O-ring seal as clearly shown in FIGURES 8 and 9. The securement is completed by turning down the extremity of the channel against the outer edge of the flange.

It will be noted that the inner edge of the channel provides a shoulder which cooperates with the inner edge of the annular flange to grip the folded over end of the sealed diaphragm. Preferably, the extremity of the channel is turned down so as to provide a minimum of 20% and a maximum of 30% rubber compression between the cooperating shoulders.

At the opposite end of the casing member 30 there is provided a ring-shaped end member 46 having an annular groove 48 formed therein similar to groove 42 for receiving the opposite end of the diaphragm. As before, the end of the diaphragm is folded over an O-ring seal 50 and the extremity of the channel is turned down into engagement with the outer edge of the ring-shaped end member to secure the same within the channel and to effect securement and rubber compression of the adjacent end of the diaphragm.

Rigidly secured to the inner periphery of the ring-shaped end member 46, as by welding or the like, is an inner tubular casing member 52 which extends inwardly of the outer casing member within the diaphragm 32. Mounted for longitudinal movement within the inner tubular member 52 is a tubular plunger member 54.

Connected between the adjacent ends of the tubular plunger member 54 and the inner tubular member 52 is a folded rolling sleeve-type seal 56. The seal is preferably made of a sleeve of flexible material such as corded rubber or the like, however, other flexible materials may be utilized. The essential characteristics of the sleeve are that it is impervious to hydraulic fluid, capable of being folded and rolled, and non-resilient so that it will not expand to any considerable extent under pressure. One end of the seal 56 is rigidly secured to the inner end of the inner tubular member 52, as by a metal clamping ring 58, and the opposite end of the sleeve is fixedly secured to the inner end of the tubular plunger member 54, as by a metal clamping ring 60. The sleeve is folded between its secured ends, one ply of the fold engaging the interior surface of the inner tubular member 52 and the other ply of the fold engaging the exterior surface of the tubular plunger member 54.

It will be seen that the length of the folded plies of the sleeve engaging the inner tubular member and tubular plunger member will increase and decrease in response to relative movement between the tubular plunger member 54 and the casing members of the hydro-pneumatic strut assembly. The interior surface of the tubular member 52 which is contacted by the folded sleeve during the relative movement between the plunger member and the cylindrical member includes an inner cylindrical portion 62, an intermediate outwardly-diverging frusto-conical portion 64, and an outer cylindrical portion 66. The surface of the tubular plunger member 54, which engages the folded sleeve includes an inner cylindrical portion 68, an intermediate outwardly converging frusto-conical portion 70 and an outer cylindrical portion 72.

Figure 2B:
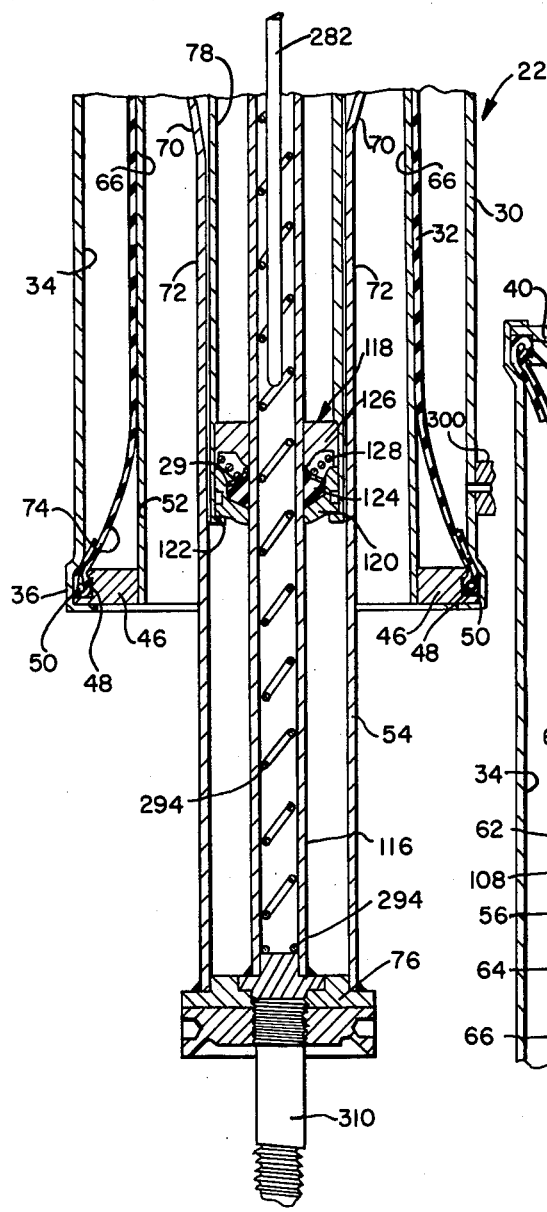
FIGURE 2B is a view similar to FIGURE 2A illustrating the lower portion of the combined unit.
Figure 2A:
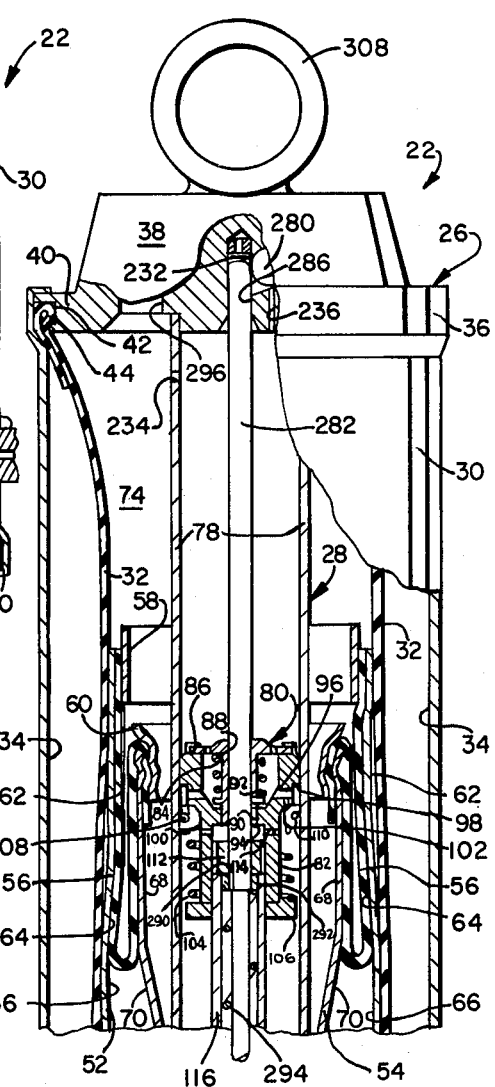
FIGURE 2A is a vertical sectional view of the upper portion of the combined self-leveling hydro-pneumatic strut and pump damper unit of the suspension system.

As best shown in FIGURES 2A and 2B with the tubular plunger member in its proper vertical position with respect to the casing members 30 and 52, the fold of the seal 56 is positioned at the intersection between the intermediate and outer portions 64 and 66 of the tubular member and the intermediate and inner portions 70 and 68 of the tubular plunger member. It will be seen that when the plunger member moves inwardly with respect to the casing members or during the compression stroke, as shown in FIGURE 3, the fold will be positioned between the intermediate portions of the members and since they converge inwardly with respect to each other the arc of the fold will increase as the plunger member moves inwardly of the casing members. The effective pressure area of the foldable seal is determined by the center of the arc of the fold so that the effective pressure area of the foldable seal decreases in response to the inward movement of the plunger member with respect to the casing members.

When the plunger member moves outwardly or during the rebound stroke, as shown in FIGURE 4, the fold will be positioned between the outer portion 66 of the interior tubular member and the inner cylindrical portion 68 of the tubular plunger member so that the effective area of the seal remains constant.

The interior surface of the sleeve diaphragm 32, the end members 38 and 46, the exterior surface of the inner tubular member 52, the interior surface of the folded seal 56 and the interior surface of the tubular plunger member 54 define an expansible and contractable hydraulic pressure chamber 74 within the hydro-pneumatic strut. The outwardly extending end of the tubular plunger member is suitably closed by an end casting or closure member 76.

The pump damper assembly 28 of the unit 22 includes a cylinder 78 having one end rigidly secured to the end member 38, as by welding or the like in concentric relation to the outer casing member 30. Mounted within the cylinder is a valved piston, generally indicated at 80, which includes a piston body 82, having an upper hollow portion provided with a periphery for engaging the interior of the cylinder 78. A sleeve 84 is disposed within the hollow portion of the upper end of the piston body and is secured thereto by an integral apertured disk 86. Surrounding the sleeve 84 is a coil spring 88, one end of which engages the disk 86 and the opposite end of which engages a ring-shaped valve member 90. The valve member 90 is adapted to engage an annular seat 92 surrounding a central interior passage 94 formed in the piston body. A plurality of circumferentially spaced passages 96 extend between the upper hollow interior of the piston body radially outwardly to a circumferential groove 98 formed therein. The periphery of the lower portion of the piston body is relieved and provides an annular seat 100 adjacent the annular groove 98. A carrier 102 of L-shaped configuration in cross-section is mounted within the relieved portion of the valve body, as by a coil spring 104, one end of which engages the carrier and the other end of which engages a washer or plate 106 secured to the lower extremity of the piston body. Mounted within the outer periphery of the carrier is a flexible packing 108 and valve ring 110, preferably in the form of an O-ring seal and a flat ring or seal is disposed between the O-ring seal and the valve seat. The lower end of the valve body is provided with a bore 112 communicating with the central passage 94 and a plurality of circumferentially spaced passages 114 extending radially from the bore to the outer reduced periphery of the valve body. Rigidly secured within the lower end of the bore 112 of the piston body is the upper end of a hollow piston rod 116, the lower end of which is rigidly secured to the end plate or member 76.

The plunger member 54 of the hydro-pneumatic strut constitutes one telescopic part of the latter while the casing members 30 and 52 constitute the other. In the pump damper assembly, the cylinder 78 constitutes one telescopic part while the piston 80 and piston rod 116 constitute the other. It will be seen that the telescoping parts of the strut and pump damper move together, that is, the piston 80 will move within the cylinder 78 in conjunction with the relative vertical movement between the plunger member 54 and the casing members 30 and 52 of the hydro-pneumatic strut. During the inward movement of the piston 80 or the compression stroke, hydraulic fluid within the cylinder 78 between the piston and the end member 38 will flow into the upper hollow end of the piston body through the apertured disk 86 and then outwardly through the passages 96 into the annular groove 98, thus moving the flat ring 110 off of the valve seat 100, permitting the fluid to pass into the lower end of the cylinder between the piston 80 and a sealing unit 118 closing the lower end of the cylinder. The sealing unit 118 preferably includes an end closure or plug 120 retained in the lower end of the cylinder by an inwardly turned flange 122 formed on the cylinder. The plug carries a flexible packing ring 124 which surrounds the piston rod and is sealingly pressed against the latter by means of a disk 126 fixed within the lower end of the cylinder and a tapered compression spring 128 mounted between the disk 126 and a compression washer 129 abutting the packing ring 124.

It will be noted that because of the existence of the piston rod in the lower end of the cylinder, more fluid will be displaced from the upper end of the cylinder during the inward movement of the piston than will be needed to fill the lower end of the cylinder. Thus, during the compression stroke, the pump damper assembly is operative to effect displacement of an amount of fluid equal to the area of the piston rod times the length of travel. This displaced fluid, under pressure, is directed to the reservoir unit 24.

When the piston unit moves outwardly with respect to the cylinder or on the rebound stroke, fluid in the lower end of the cylinder passes through the passages 114, and into the bore 112 and through the central passage 94 thus opening the valve 90 against the action of spring 88. This action permits fluid to pass from the lower end of the cylinder to the upper end. Again, because of the differences in volume within the cylinder on opposite sides of the piston due to the presence of the piston rod in the lower end of the cylinder, additional fluid must be supplied to the upper end of the cylinder. The reservoir provides such a supply of low pressure fluid to the upper end of the cylinder during the rebound stroke.

In order to control the flow of high pressure fluid from the cylinder 78 to the reservoir unit 24, there is provided in the end member 38 a longitudinally extending outlet passage 130. (See FIGURE 9.) The inner end of the passage 130 communicates with the inner end of an outwardly extending bore 132 having an inner counterbore 134 formed therein defining a frusto-conical valve surface 136. A valve member 138 is disposed within the counterbore 134 and has mounted thereon an O-ring seal 140 for engaging the valve seat 136. The valve member 138 is resiliently urged into engagement with the valve seat by means of a coil spring 142, one end of which engages the valve member and the opposite end of which engages the inner end of a threaded nipple 144 engaged within an outer counterbore 146 formed in an intermediate counterbore 148. The outer end of the nipple has fixed thereto one end of a conduit 150, which leads to the reservoir unit 24 and has a back pressure control valve 151 connected in series therewith.

As best shown in FIGURE 5, the back pressure control valve 151 comprises a valve body 152 having a bore 153 extending therethrough. Formed in one end of the bore 153 is a counterbore 154 having a piston member 155 slidably mounted therein. The piston member 155 includes an enlarged upper portion having its outer periphery grooved to receive an O-ring 156 which serves to provide a seal between the outer periphery of the piston member and the inner periphery of the counterbore 154. The lower portion of the piston member is reduced in size to a diameter less than the diameter of the bore 153 and extends into the latter. Formed on the lower extremity of the piston member is an annular valve seat 157 disposed in surrounding relation to a central opening 158 formed in the piston member. The valve seat 157 is arranged to be engaged by a disk valve member 159 which is resiliently urged into engagement with the valve seat by means of a coil spring 160 mounted within the lower end portion of the bore 153 between the disk valve member 159 and a fitting 161 threadedly engaged within the lower extremity of the bore 153.

The enlarged upper portion of the piston member 155 has a cylindrical recess 162 formed therein in communication with the opening 158. A fitting 163 is threadedly mounted within the upper extremity of the counterbore 154 and includes a depending cylindrical portion 164 of a diameter substantially equal to the diameter of the cylindrical recess 162. The lower extremity of the cylindrical portion 164 is slidably mounted within the recess and sealingly engaged therewith, by any suitable means, such as an O-ring 165 engaged within a suitable groove formed in the periphery of the cylindrical portion 164. Mounted between the fitting 163 and the piston member 155 in surrounding relation to the cylindrical fitting portion 164 is a coil spring 166 which serves to resiliently urge the piston member 155 into its lower limiting position as shown in FIGURE 5.

The valve member 159 of the back pressure control valve 151 is operable to permit high pressure fluid from the pump damper assembly to flow into the reservoir unit 24 and to prevent transgression of fluid in the opposite direction. When the hydraulic pressure stored in the reservoir unit increases, the piston member moves upwardly as shown from the position shown in FIGURE 5 against the spring 166 reducing the spring load on spring 160 and thereby reducing the differential pressure required to blow the disk valve member 159 off of the seat 157. The difference in the cross-sectional area of the outer periphery of the piston member 155 and the cross-sectional area of the cylindrical recess 162 is related to the spring rates of the springs 160 and 166 so that the upward movement of the piston member will reduce the loading of the spring 160 sufficient to maintain a constant back pressure in the line to the pump damper assembly without regard to the change in pressure in the reservoir unit. It will be understood that the back pressure control valve 151 may be embodied in the present system as a separate unit, as shown, or may be embodied as an integral part of the reservoir unit 24.

As best shown in FIGURE 6, the reservoir unit 24, embodying the principles of the present invention includes an outer tubular member or container 167 having an end plate 168 rigidly fixed, as by welding or the like, to one end thereof. Mounted within the opposite end of the housing is an end casting or closure member 169 having an annular flange 170 extending outwardly therefrom for engaging an inturned peripheral flange 171 of the container 167. Rigidly secured to the end member 169 within the container 167 is one end of an inner tubular member 172, the opposite end of which has secured thereto an end plate 173 which, in turn, is secured to the end plate 168 of the housing.

The inner tubular member 172 divides the housing into two annular compartments, the outer compartment constituting a high pressure accumulator and the interior compartment constituting a low pressure sump. Mounted within the outer compartment is a sleeve diaphragm 174 which divides the outer compartment into an outer annular high pressure gas chamber 175 and an inner high pressure hydraulic chamber 176.

The ends of the sleeve diaphragm 174 may be secured within the outer compartment by any suitable means and, as shown, the end of the tubular diaphragm adjacent the end member 169 is folded around an O-ring seal 177 engaging within an annular groove 178 formed in the peripheral flange 171 of the end plate. The opposite end of the sleeve diaphragm 174 is secured to the end plate 173 by an O-ring seal 179 engaged within an annular groove 180 formed in the end plate. Preferably, an elongated bleed tube 181 is positioned within the hydraulic chamber 176 in order to facilitate expansion of the diaphragm upon introduction of hydraulic fluid therein.

Mounted within the sump compartment is an inner sleeve diaphragm 182 which divides the inner compartment into an outer low pressure gas chamber 183 and an inner low pressure hydraulic chamber 184. The diaphragm 182 may be secured within the sump compartment by any suitable means and as shown, the end thereof adjacent the end member 169 is folded over an O-ring seal 186 engaged within an annular groove 188 formed in the end member. The opposite end of the tubular diaphragm is closed by means of a pair of elongated plates 190 suitably fastened together in sealing relation to the end of the tubular diaphragm.

The high pressure conduit 150 coming from the pump damper cylinder 78 is connected with an inlet port 192 formed in the end member 169 of the reservoir unit. The inner end of the port 192 is communicated with the high pressure hydraulic chamber 176 of the accumulator by means of a passage 194 extending therebetween. In order to prevent blockage of the inlet passage to the high pressure hydraulic chamber 176 a dowel pin 196 is secured within the end member and extends downwardly therefrom adjacent the inlet passage 194.

The inlet port 192 is also connected with the low pressure hydraulic chamber 184 of the sump through a passage 198 communicating with a central bore 200 formed in the end member. The bore 200 has a counterbore 202 formed therein which defines an annular valve seat 204. A ball valve 206 is resiliently urged into engagement with the valve seat by a coil spring 208, one end of which engages the ball, the opposite end of which engages a sleeve 210 threaded into the counterbore. The ball valve 206 constitutes a pressure responsive check valve which will open when a predetermined maximum pressure has been obtained in the hydraulic chamber of the accumulator.

In order to supply low pressure fluid from the reservoir unit 24 to the cylinder 78 of the pump damper assembly, an outlet port 212 is formed in the end plate in communication with the low pressure hydraulic chamber 184 of the sump. This port communicates with a low pressure fluid conduit 214 which also is connected with a nipple 216 threadedly engaged within an outer counterbore 218 of a bore 220 formed in the end member 38 of the unit 22. (See FIGURE 9.) The inner end of the nipple 216 is provided with an interior frusto-conical surface defining a valve seat 222. A valve member 224 having an O-ring seal 226 mounted therein is resiliently urged into engagement with the valve seat 222 by a coil spring 228 connected between the valve member and the inner end of the end member 38 defining the bore 220. The inner end of the bore 220 is communicated with the cylinder 78 by means of an inlet passage 230.

From the above, it can be seen that upon the compression stroke of the piston 80 fluid will be forced through the outlet passage 130 under pressure past the valve member 138 and through the conduit 150 to the reservoir unit 24. The high pressure fluid flowing into the reservoir unit is then directed through the inlet port 192 and passage 194 into the high pressure hydraulic accumulator chamber 176. Of course, if this chamber is already under a predetermined maximum pressure, check valve 206 will open permitting the pressurized fluid to flow into the low pressure hydraulic sump chamber 184 through passage 198 and bore 200.

On the rebound stroke of the piston unit, low pressure fluid is replenished into the cylinder 78 from the low pressure hydraulic sump chamber 184 through the outlet port 212, conduit 214, by valve 224, and through inlet passage 230. In this way, the pump damper assembly 28 serves to convert part of the energy of relative movement between the sprung and unsprung masses of the vehicle into hydraulic pressure energy and this hydraulic pressure energy is accumulated or stored in the high pressure hydraulic chamber 176 of the reservoir unit 24.

The present system contemplates the utilization of this hydraulic pressure energy to maintain the hydro-pneumatic strut assembly 26 in a predetermined vertical relationship so that the strut will support the sprung mass of the vehicle in a predetermined vertical relation with respect to the unsprung mass regardless of the static load carried thereby. To this end, the unit 22 includes a leveling valve mechanism generally indicated at 232. In general, the leveling valve mechanism is constructed in accordance with teachings of my co-pending application Serial No. 814,065 and is arranged to communicate the high pressure hydraulic accumulator chamber 176 with the hydraulic chamber 74 of the hydro-pneumatic strut as the sprung mass moves downwardly with respect to the unsprung mass below its predetermined vertical position thus permitting hydraulic fluid to flow into the hydraulic chamber 74 until such time as the sprung mass is raised into its predetermined position. When the sprung mass moves above its predetermined vertical position with respect to the unsprung mass, the leveling valve mechanism is operable to exhaust hydraulic fluid from the hydraulic chamber 74 of the hydro-pneumatic strut into the low pressure hydraulic sump chamber 184.

To this end, a bleed orifice 234 is formed in the cylinder 78 to communicate the hydraulic chamber 74 of the hydro-pneumatic strut assembly with the upper end of the pump damper cylinder. The end member 38 forms a valve body for the leveling valve mechanism and has formed therein a working port 236 extending longitudinally therein in communication with the pump damper cylinder 78 (see FIG. 8). The inner end of the port 236 communicates with a bore 238 formed in the end member 38 in a position between the outlet and inlet passages 130 and 230 as shown in FIGURES 10 and 11. The bore 238 has first and second counterbores 240 and 242 formed therein which define therebetween an annular valve seat 244. Communicating with the second counterbore in longitudinally-spaced relation are an inlet or high pressure port or passage 246, which extends diagonally from the intermediate counterbore 148 associated with the high pressure conduit 150 to the inner portion of the second counterbore 242, and an outlet or low pressure port or passage 248, which extends diagonally between the outer counterbore 218 associated with the low pressure conduit 214 and the outer end portion of the second counterbore 242. In regard to the latter, it will be noted that the exterior of the nipple 216 is provided with an annular groove 250 adjacent passage 248, such groove being communicated with the interior of the nipple by means of a pair of diametrically opposed radially extending openings 252.

Fixedly mounted within the second counterbore 242 is a valve insert 254 having a pair of longitudinally-spaced annular recesses 256 and 258 formed in the exterior surface thereof, the portion of the valve insert 254 between the recesses being disposed between the ports 246 and 248 to separate the same. Formed within the valve insert is a central bore 260 which is communicated with the recess 258 by means of a plurality of circumferentially-spaced radial openings 262.

A valve member 264 is slidably mounted within the central bore 260 of the insert. The valve member includes an annular flange 266 extending radially outwardly from one end thereof beyond the adjacent end of the valve insert. The end of the valve member is provided with a frusto-conical surface 268 for engaging the valve seat 244, such surface being resiliently urged into engagement with the valve seat by means of a coil spring 270 positioned between the annular flange 266 and valve insert 254. The engagement of the frusto-conical surface 268 of the valve member 264 with the valve seat 244 controls the flow of hydraulic fluid from the high pressure port 246 to the working port 236.

The valve member is also provided with a central bore 272, the inner end of which is communicated with the central bore 260 of the valve insert by means of a restricted orifice 274. Formed in the opposite end of the central bore 272 of the valve member is a counterbore 276, the outer end of which is formed with a frusto-conical valve seat 278. A ball valve 280 for engaging the seat 278 is disposed within the inner end portion of the bore 238 for longitudinally reciprocating movement.

The ball valve controls the flow of hydraulic fluid from the working port 236 to the low pressure port 248. It will be noted that the flow from the high pressure port to the working port and the flow from the working port to the low pressure port is interrupted when the ball valve 280 is disposed in the position illustrated in FIGURE 8. This position constitutes a null position of the valve mechanism and the ball valve is maintained in this position by means of a cam rod 282 having one end thereof provided with a semispherical cam surface 284 arranged to reciprocate within a longitudinal bore 286 formed in the central portion of the end member 38 to engage the adjacent surface of the ball valve. A coil spring 288 is disposed within the counterbore 276 of the valve member 264 in engagement with the ball valve to resiliently urge the latter into engagement with the cam rod.

As best shown in FIGURE 2A, the opposite end of the cam rod 282 extends through the sleeve 84 of the piston 80 and a sleeve 290 fixedly mounted within the adjacent end of the hollow piston rod 116. Fixed to the adjacent portion of the cam rod is a ferrule 292, one surface of which is arranged to engage the sleeve 290 to limit the upward movement of the cam rod when the pump damper assembly 28 is disposed in its normal predetermined position. The cam rod is maintained in its limiting position by means of a coil spring 294 mounted within the hollow piston rod between the opposite surface of the ferrule 292 and the end member 76 of the tubular plunger member. Preferably, the cam rod is reduced at its lower end portion so as to extend within the coil spring 294 as shown in FIGURE 2.

It will be understood that any suitable means may be provided for introducing hydraulic fluid and air into the various chambers of the system. For example, the end member 38 of the combined hydro-pneumatic strut and pump damper unit may be provided with a longitudinally extending opening 296 through which oil may be introduced into the hydraulic chamber of the strut and also into the cylinder of the pump damper. The opening 296 may be closed by a suitable plug 298. The air chamber 34 of the combined unit 22 may be filled with air under pressure through a fitting 300 arranged to be closed by a cap 302. Air under pressure is introduced into the outer gas chamber 175 of the reservoir unit 24 by a similar fitting 304 arranged to be closed by a cap 306.

Referring now more particularly to FIGURE 1, it will be seen that four combined units 22 are provided adjacent the wheels of the vehicle. As shown, the two units 22 associated with the front wheels are connected in parallel with a reservoir unit 24 and the rear units 22 are connected in parallel to a second reservoir unit 24. It will be understood that while the arrangement as shown is preferred, each of the units 22 may be provided with a reservoir unit or a single reservoir unit may be provided for all four of the units 22.

In general, the units 22 are connected between the sprung and unsprung masses of the vehicle in a conventional manner. As shown, an eye-connecter 308 is rigidly secured to the upper end of the end member 38 and a stem connector 310 is rigidly secured to the end member 76. With this arrangement the stem connector 310 is resiliently mounted on a bracket or the like fixed to the associated wheel mounting structure and the eye-connector 308 is resiliently pivoted to the frame at an appropriate position. Of course, other types of connectors may be employed and both ends of the unit may be provided with either stem type connectors such as the connector 310, or eye-type connectors such as the connector 308. The reservoir units are preferably secured to the frame or sprung mass of the vehicle and any suitable means may be employed for this purpose, such as brackets 312.

As indicated above, the action of the pump damper assembly 28 during travel of the vehicle is such as to supply hydraulic fluid under pressure to the high pressure accumulator chamber 176 of the reservoir unit 24. Thus, considering the operation of the present system with the vehicle in a parked or at rest position with the motor off, the high pressure hydraulic chamber of the reservoir unit will be substantially filled with hydraulic fluid and under maximum pressure. Examples of the pressure available in the reservoir as shown in FIGURE 6 is as follows. The high pressure gas chamber 175 is under an initial pressure of approximately 100 p.s.i. The hydraulic fluid within the high pressure hydraulic chamber 176 is maintained between 100 and 350 p.s.i. At 350 p.s.i. the reservoir contains approximately 30 cubic inches of hydraulic fluid. The low pressure gas chamber is initially at atmospheric pressure.

It is contemplated that in a normal installation approximately 6 cubic inches are needed to level a five-passenger load for each hydro-pneumatic strut unit. Thus, one reservoir unit 24 could be employed to effect the leveling action of four hydro-pneumatic struts. However, it is preferable to employ a reservoir unit for each pair of struts as shown and described above. Under these conditions, it can be seen that there is ample energy available in the reservoir unit to effect a leveling of the vehicle frame when the same is statically loaded, as by five passengers boarding the same, without the necessity of the automobile being in motion or even the engine running. Moreover, the present reservoir unit could effect a leveling action even when the vehicle is filled and emptied two or three times before the engine is started and the vehicle is put into motion.

Under static conditions it will be noted that when a load is imposed upon the vehicle such as when passengers board the same or a payload is added in the case of truck vehicles, the hydro-pneumatic strut will be inwardly telescoped along with the pump damper assembly. That is, the tubular plunger member will move upwardly with respect to the casing members 30 and 52 and the piston rod and piston of the pump damper assembly will move inwardly with respect to the cylinder 78.

During this movement, the cam rod 282 will move upwardly with the piston 80 through the action of spring 294, which, of course, is of a strength sufficient to overcome the strength of spring 270 of the valve mechanism. The upward movement of the cam rod 282 will effect movement of the ball valve 280 away from the opening 286 which, in turn, moves the valve surface 268 away from the valve seat 244 as shown in FIGURE 10.

With the valve member 264 in the position shown in FIGURE 10, high pressure hydraulic fluid from port 246 is free to pass into the bore 242, past valve seat 244 and then through the working port 236 and into the pump damper cylinder 78. From the pump damper cylinder fluid passes through the bleed orifice 234 into the hydraulic chamber of the strut assembly.

Figure 8:
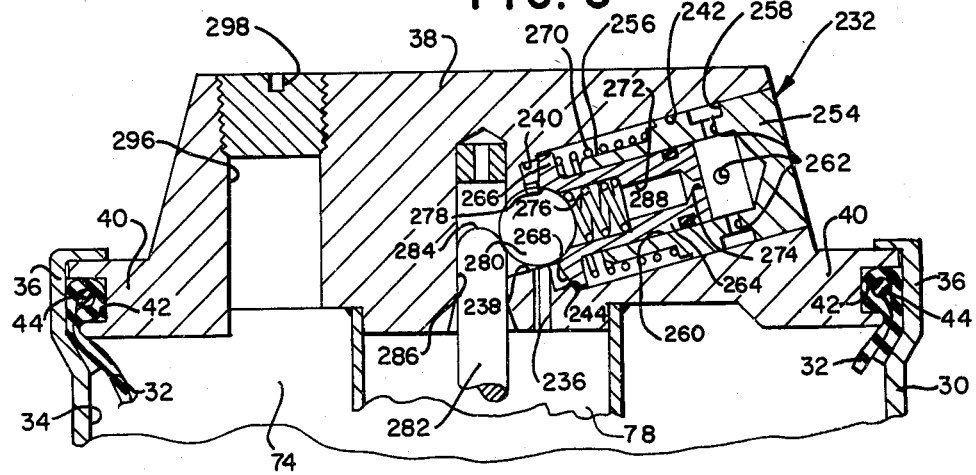
FIGURE 8 is an enlarged, fragmentary longitudinal sectional view of the upper end portion of the combined self-leveling hydro-pneumatic strut and pump damper unit taken through the axis of the valve mechanism and showing the position of the valve mechanism when the vehicle frame is positioned at its proper height.
Figure 9:
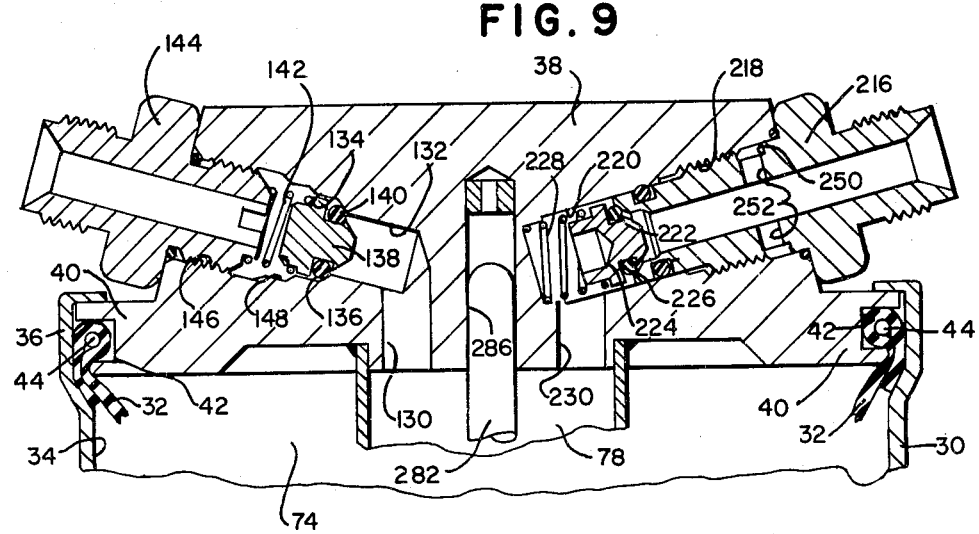
FIGURE 9 is a fragmentary longitudinal sectional view of the structure shown in FIGURE 8 taken at a 90° angle with respect thereto, showing the position of the inlet and outlet valves when the vehicle frame is positioned at its proper height.

It will also be noted that in order for the piston unit 80 to move upwardly within the cylinder 78, hydraulic fluid must also be forced out of the outlet port 130 past the valve 138. At the same time the air chamber 34 of the strut will compress. Of course, where static loads are involved, the flow of fluid outwardly of the cylinder 78 through the outlet port 130 will cease before enough fluid has been introduced into the cylinder through the working port 236 of the valve mechanism to expand the unit 22 back into its normal predetermined position. Thus, hydraulic fluid under pressure from the high pressure hydraulic chamber 176 of the reservoir unit will continue to pass into the cylinder 78 through port 246 and through the leveling valve mechanism until the expansion of the unit moves the frame back into its predetermined position. At that time the cam rod 282 will move back into its normal predetermined position thus permitting the valve mechanism to assume its null position as shown in FIGURE 8.

When the static load on the vehicle is removed, as by passengers alighting from the vehicle, the air in the air chamber 34 will expand causing the telescoping parts of the unit to likewise expand. As before, the expansion will effect movement of hydraulic fluid from the low pressure hydraulic chamber 184 of the reservoir unit into the cylinder 78 past valve 224 and inlet port 230. At the same time the cam rod 282 is moved downwardly by the engagement of sleeve 290 with ferrule 292, permitting the ball valve to move toward the opening 286 against the action of spring 288 into the position shown in FIGURE 11.

With the valve mechanism in the position shown in FIGURE 11, hydraulic fluid within the cylinder 78 is free to pass to the low pressure chamber 184 of the reservoir unit past the ball valve 280, through the central bore 272, orifice 274, openings 262, groove 258, low pressure passage 248, groove 250 and openings 252. Again, the intake of hydraulic fluid through the inlet port 230 will be interrupted prior to the exhausting of the hydraulic fluid through the leveling valve mechanism. This latter action will continue until the cam rod 282 moves back into its predetermined position and the ball valve 280 is moved into engagement with the valve seat 278.

Under the dynamic conditions encountered during travel of the vehicle, the above actions take place in a rapid manner. The size of the ports 246 and 248 and the size of the bleed orifice 234 determine to a large extent the ride characteristics of the present system. As the ports and orifice are decreased in size to increase restriction to flow, the amount of pumping action of the pump damper assembly increases. Thus, for a given energy input the amount of pump output will vary according to the size of the ports 246 and 248 and the size of the orifice 234. The maximum size of the openings is limited in that they must be small enough to permit more oil to be moved by the piston than can be handled through the leveling valve mechanism and the bleed orifice 234.

The pump damper assembly, in addition to its pumping action, also provides a damping action, the requirement for which is inversely proportional to its pumping action. That is, the more pumping action achieved by the pump damper the less dampening action it must have. It is preferable to make the ports 246 and 248 and the orifice 234 relatively small to achieve a greater pumping action, since the damping action of the pump damper need not have as great an effect on the ride due to the cushioning effect of the air chamber 34 as if the vehicle frame were suspended with conventional metal springs.

The back pressure control valve 151 is important in relation to the damping action of the pump damper assembly since it acts to maintain a substantially constant downstream blow off pressure on the valve member 138, thereby insuring that the damping characteristics of the pump damper assembly will not vary in accordance with the accumulator pressure. With the use of a spring load check valve such as the valve member 138, the pressure on the down-stream side of the valve member would affect the pressure in the pump damper chamber required to unseat the valve. If the down-stream pressure on the valve member 138 is allowed to vary in relation to the variance of the accumulator pressure then the damping characteristics of the pump damper assembly would vary in accordance with the accumulator pressure. The back pressure control valve 151 is operable to maintain a substantially constant pressure on the down-stream side of valve member 138 through the action of the piston member 155 and the opposing coil springs 160 and 166.

The up-stream pressure required to blow off the valve member 159 of the back pressure control valve 151 is equal to the differential pressure on the down-stream side of the valve member 159 plus the force of spring 160. As this down-stream pressure, which is equal to the accumulator pressure, increases, the force of the spring 160 decreases proportionally. This relationship is accomplished due to the movement of the piston member 155 against the action of spring 166 as the down-stream or accumulator pressure increases. As the piston member 155 moves against the spring 166 the force imposed by the spring 160 is reduced. Conversely, the force of spring 160 will increase in response to a decrease in accumulator pressure. In this way, the up-stream pressure acting on the valve 159 is maintained at a substantially constant value. That is, at the point during the normal cycle of operation when valve member 138 must blow off, the back pressure thereon will be at a value which is substantially the same irrespective of the accumulator pressure. The valve member 138 momentarily is set to blow off at maximum accumulator pressure, as for example 350 p.s.i., and because the back pressure on this valve is constant, at least at the time just prior to blow off, the valve member 138 will always blow off at 350 p.s.i. regardless of the pressure in the high pressure hydraulic chamber 176. Variance in pressure of the low pressure hydraulic chamber 184 has a negligible effect on the damping characteristics of the pump damper assembly.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A hydraulic pressure reservoir comprising a pressure container having a rigid inner member disposed therein dividing said container into inner and outer pressure compartments, an outer sleeve of flexible material between said container and said member dividing said outer compartment into a gas chamber and a hydraulic chamber, a inner sleeve of flexible material within said inner member dividing said inner compartment into a gas chamber and a hydraulic chamber, one of said hydraulic chambers and the associated gas chamber being high pressure chambers, the other hydraulic chamber and the associated gas chamber being low pressure chambers, and means providing for the passage of hydraulic fluid into and out of each of said hydraulic chambers.

2. A hydraulic pressure reservoir as defined in claim 1 including means communicating said high and low pressure hydraulic chambers having valve means permitting such communication only when the pressure within said high pressure hydraulic chamber has reached a predetermined value.

3. A hydraulic pressure reservoir comprising an outer tubular casing having closure members at opposite ends thereof, an inner tubular member within said casing extending between said end closure members and dividing the interior space defined by said casing and end closure members into an outer annular high pressure compartment and an inner low pressure compartment, a sleeve of flexible material between said casing and said inner member dividing said high pressure compartment into an annular high pressure gas chamber and an annular high pressure hydraulic chamber, a sleeve of flexible material within said inner member dividing said low pressure compartment into a low pressure air chamber and a low pressure hydraulic chamber, and means providing for the passage of hydraulic fluid into and out of each of said hydraulic chambers.

4. A hydraulic pressure reservoir as defined in claim 3 wherein one of said closure members has formed therein a high pressure port communicating with said high pressure hydraulic chamber and a low pressure port communicating with said low pressure hydraulic chamber.

5. A hyraulic pressure reservoir as defined in claim 4 wherein said one end member includes a second low pressure port communicating with said high pressure port and a pressure relief valve in said low pressure port operable in response to an increase in pressure within said high pressure hydraulic chamber above a predetermined value to permit flow of hydraulic fluid from said high pressure hydraulic chamber to said low pressure hydraulic chamber.

References Cited in the file of this patent
UNITED STATES PATENTS

| | | |
|---|---|---|
| 2,351,761 | Hanna | June 30, 1944 |
| 2,501,773 | Johnson | Mar. 28, 1950 |
| 2,760,518 | Peet | Aug. 28, 1956 |
| 2,845,951 | Hugley | Aug. 5, 1958 |